United States Patent [19]
Klonowski

[11] Patent Number: 5,479,514
[45] Date of Patent: Dec. 26, 1995

[54] METHOD AND APPARATUS FOR ENCRYPTED COMMUNICATION IN DATA NETWORKS

[75] Inventor: John L. Klonowski, Durham, N.C.

[73] Assignee: International Business Machines Corporation, Armonk, N.Y.

[21] Appl. No.: 200,610

[22] Filed: Feb. 23, 1994

[51] Int. Cl.$^6$ ................................ H04L 9/02; H04K 1/00
[52] U.S. Cl. ................................ 380/47; 380/23; 380/25; 380/48
[58] Field of Search ................................ 380/47, 48, 23, 380/25

[56] References Cited

U.S. PATENT DOCUMENTS

| | | |
|---|---|---|
| 4,423,287 | 12/1983 | Zeidler . |
| 4,638,356 | 1/1987 | Frezza . |
| 4,914,571 | 4/1990 | Baratz et al. ........................ 364/200 |
| 5,210,794 | 5/1993 | Brunsgard ............................ 380/9 |
| 5,319,710 | 6/1994 | Atalla et al. ........................ 380/23 |
| 5,386,471 | 1/1995 | Bianco ............................ 380/49 |
| 5,416,842 | 5/1995 | Aziz ............................ 380/30 |

OTHER PUBLICATIONS

IBM Manual SC 30-3269-3; 1985; "Systems Network Architecture Format and Protocol Reference Manual: Architecture Logic for LU Type 6.2".

*Primary Examiner*—Stephen C. Buczinski
*Attorney, Agent, or Firm*—Jerry W. Herndon

[57] ABSTRACT

A secure network data communication technique that allows the designation of selected network nodes to share encryption keys with other selected network nodes. A message originating node determines nodes along a message route with which it shares encryption keys. One of these keys is selected and a message is encrypted with the key. The identity of the originating node and the decrypting node that also knows the selected key is added to the encrypted message in clear form. The decrypting node receives the message, recognizes its identity in the message and decrypts the message using the key shared with the originating node. If it is also not the destination node, it repeats the process of selecting a new encrypting node with which it shares a key, re-encrypting and transmitting re-encrypted message toward the destination.

11 Claims, 8 Drawing Sheets

FIG. 3

KEY SELECTION TABLE (KST)

| | Node — 300 | Key — 302 |
|---|---|---|
| 1 | Node B | Key for Node B |
| 2 | Node E | Key for Node E |

FIG. 4

PACKET

| Encrypting Node ID — 400 | Decrypting Node ID — 402 |
|---|---|
| 404 Encrypted message ||

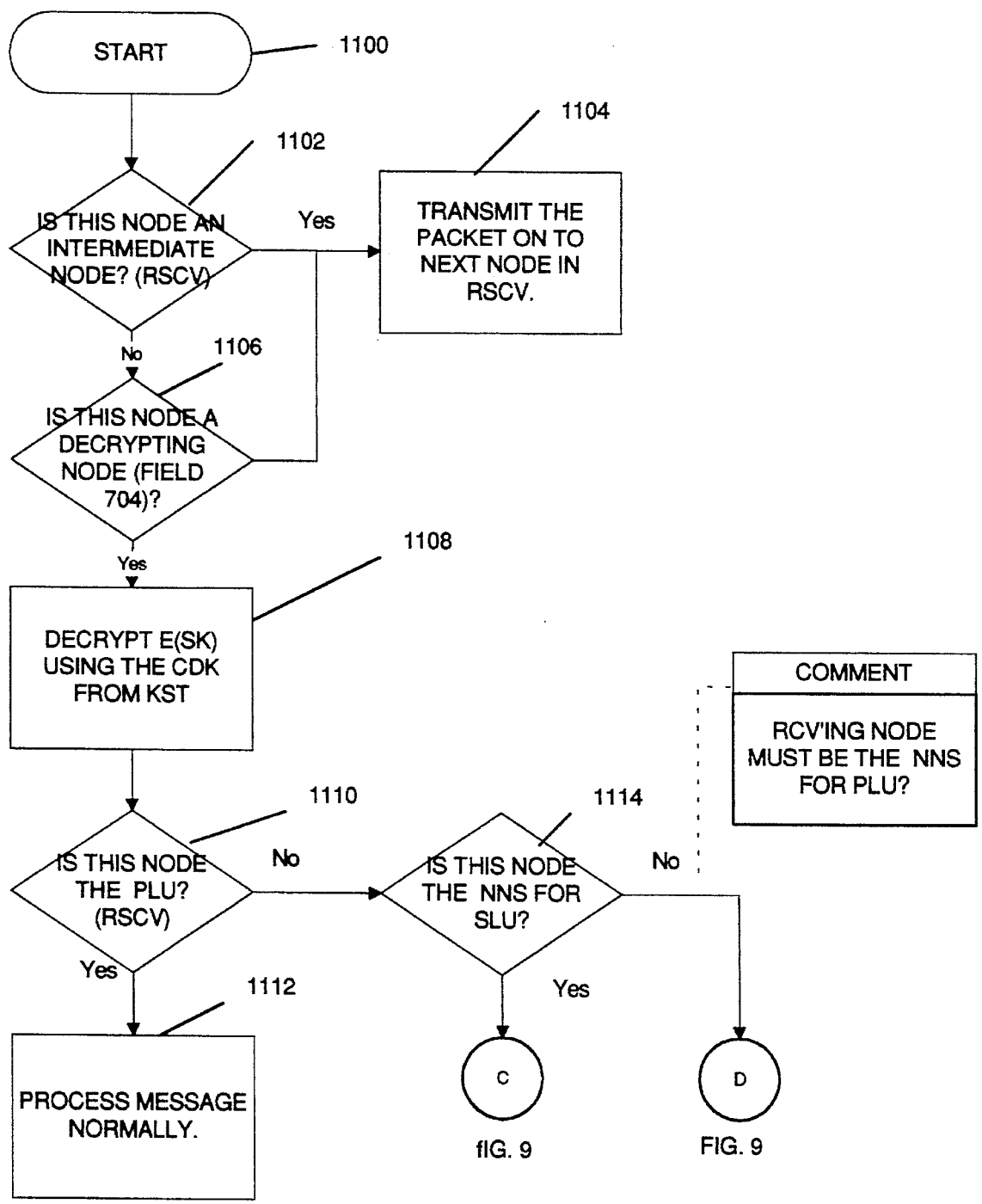

METHOD AND APPARATUS FOR ENCRYPTED COMMUNICATION IN DATA NETWORKS

TECHNICAL FIELD

The invention relates to data networking in general and especially to data encryption and decryption in such networks. In particular, the invention relates to the selection, dissemination and use of multiple keys in networks for the purpose of data encryption and decryption in a way that avoids security problems when private networks include non-private portions and also reduces the known problem of key proliferation.

BACKGROUND OF THE INVENTION

In this day of heterogeneous and vendor independent networks, problems arise in maintaining secure communications in a network. For example, one such problem arises when a private network includes communication nodes that are provided by independent network vendors.

One common technique of providing secure communications is to encrypt and decrypt messages communicated between adjacent nodes of a network enroute to a destination node. Thus, a sending node encrypts a message using a key shared between it and the next adjacent node in the route. Upon receiving the encrypted message, the adjacent node decrypts the message and encrypts the now clear message with a new key shared between itself and the next adjacent node in the route, and so on. This is the technique used in IBM's subarea SNA (System Network Architecture) networks. Every node in the network must share an encrypting key with each of its adjacent nodes in the network. This means that if any node in a route between a message originating node and a destination node belongs to an independent vendor, that independent node must share keys with the adjacent private network nodes. This is an unacceptable security risk for many network users.

A possible solution to, the above problem is to assign a single key for all encrypted communications between the private user nodes of a network. This allows a network to use public vendor portions without the sharing of keys with the independent vendor. However, this is usually thought to be unacceptable, especially in large networks, because of the heightened risk involved with using a single key for all user nodes.

Another solution to the above problem is to maintain separate keys at every private node for every other private node in a user network. However, this is unacceptable to many network owners because of the proliferation of keys. For example, in a network of one thousand private user nodes, this solution requires that each private node store 999 separate keys for the remaining user nodes.

SUMMARY OF THE INVENTION

The invention improves secure data communication in a network by allowing network owners to select and designate selected network nodes to share encryption keys with other selected nodes of the network. The arrangement allows encrypted communication throughout a properly designed network, while at the same time avoiding the necessity of sharing encryption keys with independent vendor nodes and avoiding key proliferation prevalent in other networks.

An originating node wishing to send an encrypted message to a destination node determines a route to the destination node. The originating node then determines the nodes along the route with which it shares encryption keys. The originating node selects a key associated with one of these nodes and encrypts the message using the selected key. It adds to the encrypted message its own identity and that of the node associated with the selected key. The message is then transmitted on the route. When the node sharing the selected key receives the message, it recognizes from the node identifiers included in clear form in the message that it is designated as a decrypting node. It decrypts the encrypted portion of the message using the key shared with the originating node. It also determines if it is the destination. If so, it processes the decrypted message in any appropriate manner. If it is not the destination node, it repeats the process of selecting a new encrypting node with which it shares a key, re-encrypting the message, adding its identity and that of the new decrypting node in clear form to the re-encrypted message and transmitting the new message on toward the destination node.

The preferred embodiment of the invention occurs in conjunction with peer-to-peer networks, such as IBM's Advanced-Peer-to-Peer Networking (APPN) Architecture. Both Advanced-Peer-to-Peer Networking and APPN are trademarks of IBM. The invention solves the security problem with vendor independent nodes and simultaneously mitigates the problem of key proliferation in APPN networks. APPN networks have both end nodes and network nodes that serve end nodes and provide other generic network services, such as message routing. In an APPN network, the invention allows any private node in the network to use any one of several keys to encrypt a communication. Due to constraints in an APPN network, an originating end node may share a key with a destination end node, or a key with a network node that serves a destination end node, or a key with a network node that serves the originating end node. Network nodes may share keys with other network nodes and the end nodes that they serve. Any desired criteria can be used for selection when alternative keys exist for encrypted communication between nodes. In the preferred embodiment, the originating node selects the shared key for the longest span possible between it and the destination node and encrypts a message using this key. It appends to the encrypted message an identification in clear form of the decrypting node corresponding to the selected key and its own identity in clear form. Each node in the route receiving this communication examines the decrypting node identification and passes the communication along until it reaches the identified node. The identified node decrypts the message using the key shared with the originating node. If the decrypting node is not the destination node, it then selects another key known to it that is shared with another node further down the message route, according to a criteria similar to that used by the originating node. The decrypted message is re-encrypted with the new key, the identification of this new encrypting node and that of the downstream decrypting node sharing the new key is appended to the newly encrypted message and the communication is forwarded onward on the route toward the destination node. Of course, this route includes the identified node that is next to decrypt the message. Private network nodes never share a key with any independent vendor nodes. The key proliferation problem is reduced because every private node need not share a key with every adjacent node or with every other node in the network.

In general, network owners have great flexibility in designating the nodes that share keys with other nodes; route selection can be performed accordingly to ensure that satisfactory encrypted network communication is possible. The same is true for an APPN network within the defined constraints outlined pertaining to end nodes and their serving network nodes.

BRIEF DESCRIPTION OF THE DRAWING

The invention will be understood with reference to the drawing, in which

FIG. 3, in accordance with the invention, shows an illustrative format for a Key Selection Table that is maintained at each private node of a user network and identifies other nodes with which a node shares encrypting and decrypting keys and tile shared keys;

FIG. 4 shows an illustrative data packet communication for transmission in a network and which contains an encrypted message field and identification fields for identifying a node which has encrypted the message and a decrypting node that shares a key with the encrypting node which should decrypt the message;

FIGS. 8 through 11 show illustrative flowcharts of the algorithms executed at the nodes of an APPN network to provide encrypted, secure communication in accordance with the invention.

DETAILED DESCRIPTION

Figure 1:
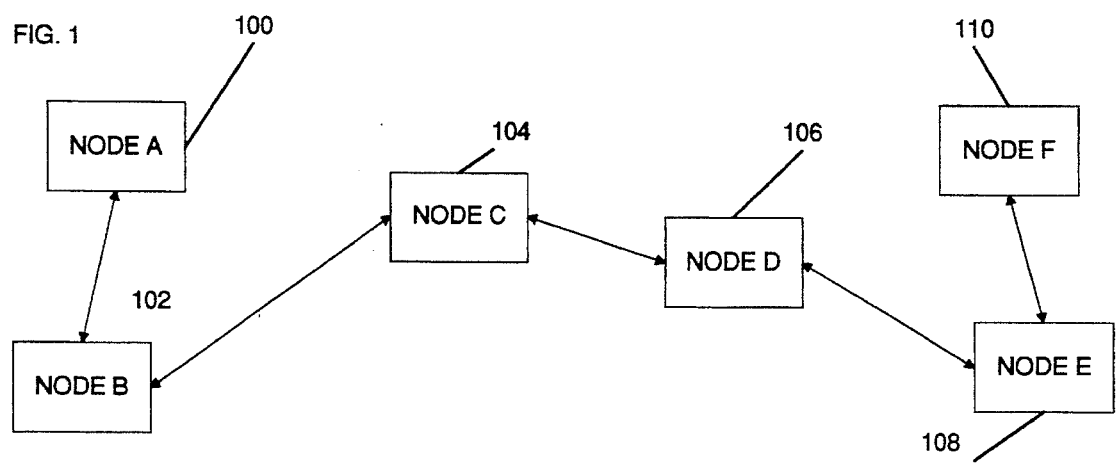
FIG. 1 represents a simplified block diagram of an illustrative general user network.

FIG. 1 represents a simplified block diagram of an illustrative user network including nodes A through F. These nodes are shown as being connected in tandem purely for simplicity; any physical network connectivity is possible. In IBM's prior art subarea network, if node A (100) wishes to communicate with node F (110) using encrypted messages, then node A shares a key with node B (102), node B shares a key with node C (104), and so on. An encrypted message sent from node A to node F is first decrypted by node B when it receives the message, using the key shared with node A. Node B then reencrypts the message with the key it shares with node C and sends the reencrypted message to node C. Node C repeats these operations and so on until node F receives the message and decrypts it with the key it shares with node E (108). This method of encrypting between adjacent nodes of a subarea network is described in IBM publication "SNA Format Protocol Reference Architecture Logic for LU 6.2", publication number SC30-3269.

Figure 2:
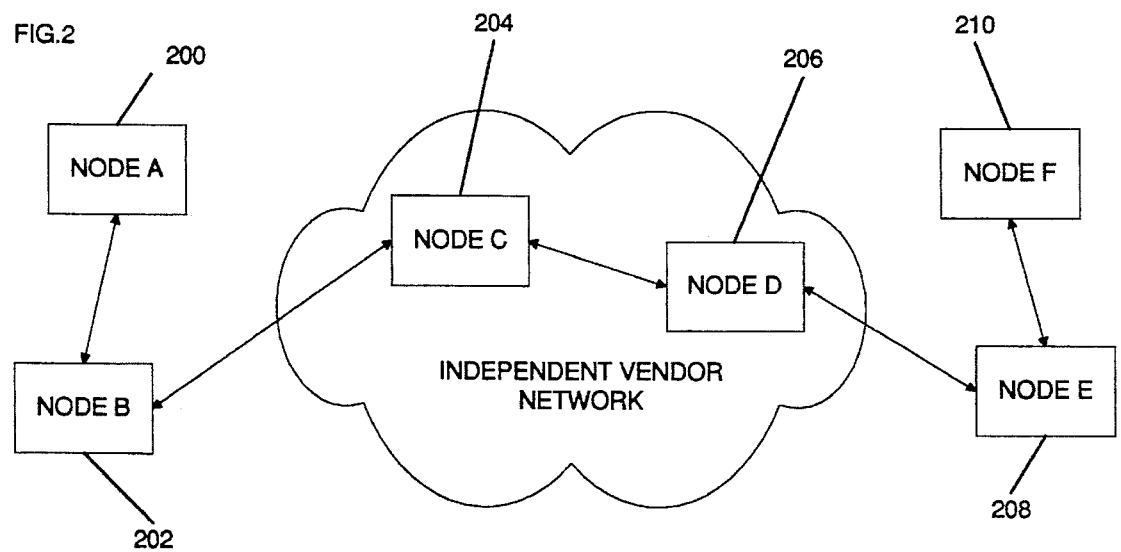
FIG. 2 represents the same network of FIG. 1, but in which a transport portion of the network is provided by an independent vendor.

FIG. 2 illustrates the same network as FIG. 1, but in which transport nodes C and D (204 and 206, respectively) are provided by a vendor independent of the remainder of the network. In this situation, it is seen that to use IBM's subarea encrypting technique of FIG. 1 requires that node B share a key with independent vendor node C, and similarly for nodes D and E. This is an unacceptable situation for many network owners and is avoided by the invention. As will be described, with the invention, the owner of the private network nodes A, B, E and F of FIG. 2, may arbitrarily designate nodes that share keys with other nodes, within the constraint, of course, that there must be some path from an originating node to a destination node that also allows for full end to end encrypting and decrypting.

FIG. 3 shows an illustrative table format for a Key Selection Table (KST) that allows the designation of keys described above. A different KST is maintained at each private node and identifies other nodes with which a node shares a key; it also identifies each shared key. With reference to FIG. 3, each KST entry contains a node identification field 300 and a key field 302. The example of FIG. 3 is an illustrative KST for node A (200) of FIG. 2. The network owner has decided that node A shares keys only with nodes B (202) and E (208). Thus, the number of KST entries N for node A in this simplified network equals two. When a message is sent from node A to node F, node A examines the KST and selects a key of a node along the route to the destination node. Any desired selection criteria may be used, although perhaps a preferred criteria would be to select the node with which the sending node shares a key that is also closest to the destination node. Using this latter criteria, to transmit an encrypted message to node F, node A would examine its KST and select entry 2 corresponding to Node E. A packet is then formed which includes in field 404 of FIG. 4 a message encrypted with the key 302 from the selected entry of the KST table. The sending node A attaches a header to the encrypted message which includes in field 400 the identity of the encrypting node (node A in this case) and in field 402 the identify of the selected node that shares the key with the encrypting node (node E in this example). The packet header also contains other information that enables nodes in the route to determine the selected route to the destination node. There are many conventional ways of accomplishing this that are employed in commercially available networks. In APPN networks, for example, a Route Selection Control Vector (RSCV) is included as part of the message header as described below. However, the technique of how the route is determined by intermediate nodes forms no significant part of the invention and is not otherwise described in detail.

Node A now sends the packet to node B. Node B examines the communication and determines that it is not identified in field 402. It therefore takes no further action pertinent to the invention, except to transmit the communication on toward its final destination. In the example of FIG. 2, independent vendor nodes C and D have no way of decrypting the message and merely route the communication forward conventionally. Eventually, the communication arrives at node E where it is determined that node E is identified in header field 402. As a result, node E determines from field 400 that node A encrypted the message in field 404. Node E searches its KST table for node A, retrieves the key shared with node A and decrypts the message portion of the communication accordingly. Node E determines if it is the final destination.

If so, it processes the decrypted message in any appropriate manner. If it is not the final destination, it then repeats the steps originally performed by node A in encrypting the message and forwarding it on to its destination. Specifically, it determines from the header that node F is the destination; it determines from its KST that it shares a key with node destination node F. It then reencrypts the message with the key shared with node F, adds its identity to field 400 of a new communication and the identity of node F to field 402 and transmits the communication to node F. Upon receipt of the communication, Node F determines from field 402 that it should decrypt the message portion of the communication. It also determines in any desired manner that it is the destination node; it therefore processes the decrypted message in an appropriate manner depending on the message.

Figure 5:
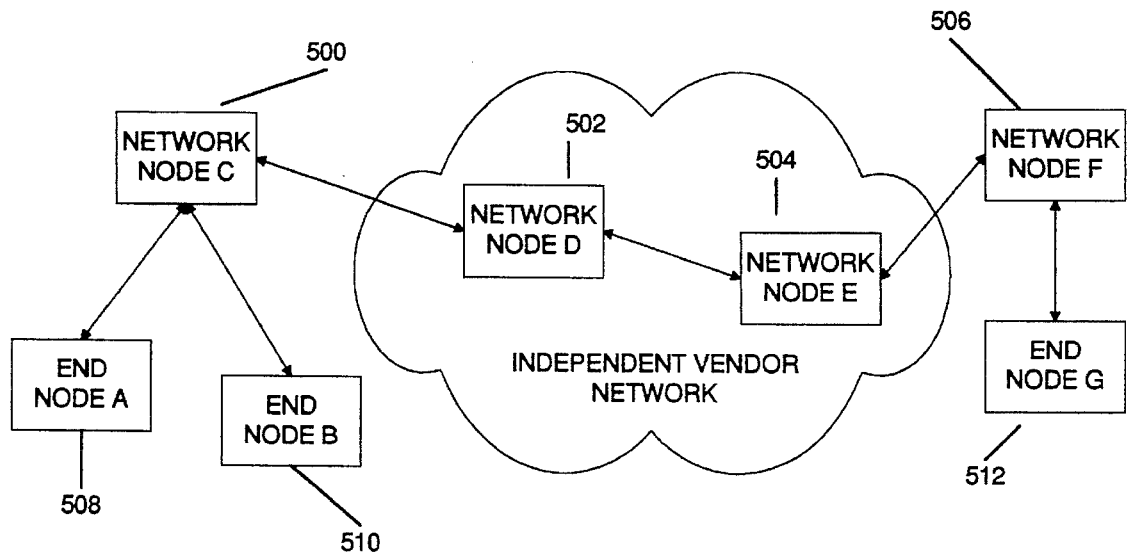
FIG. 5 shows an illustrative network similar to that of FIG. 2, but couched in terms of IBM's Advance-Peer-to-Peer Networking Architecture in which some nodes are full service network nodes and others are end nodes, such as workstations, printers and the like, served by network nodes.

The preferred embodiment of the invention resides in a network that utilizes IBM's Advanced Peer-to-Peer Networking (APPN) architecture. Such a network is illustrated in FIG. 5. An APPN network may consist of both network nodes and end nodes. In FIG. 5, nodes C, D, E and F (500, 502, 504 and 506 respectively), by way of example, are assumed to be network nodes. Nodes A, B and G are assumed to be end nodes. The APPN architecture is well known and publicly documented. It will be discussed here only to the extent necessary to provide an understanding of the invention in this environment. End nodes are typically workstations, printers or the like, but may contain more elaborate computing facilities, such as minicomputers or larger systems for processing data. A network node provides services for the end nodes attached to it and communicates with other network nodes. For example, a network node provides session establishment and routing services between itself and end nodes that it serves to other network and end nodes. Network nodes also provide directory services for the locating of resources in a network in response to requests to establish sessions with other network resources. An end node is always served by one network node. One example of an APPN network which uses identified network node processors and other publicly known structure is IBM's AS/400 system.

Figure 6:
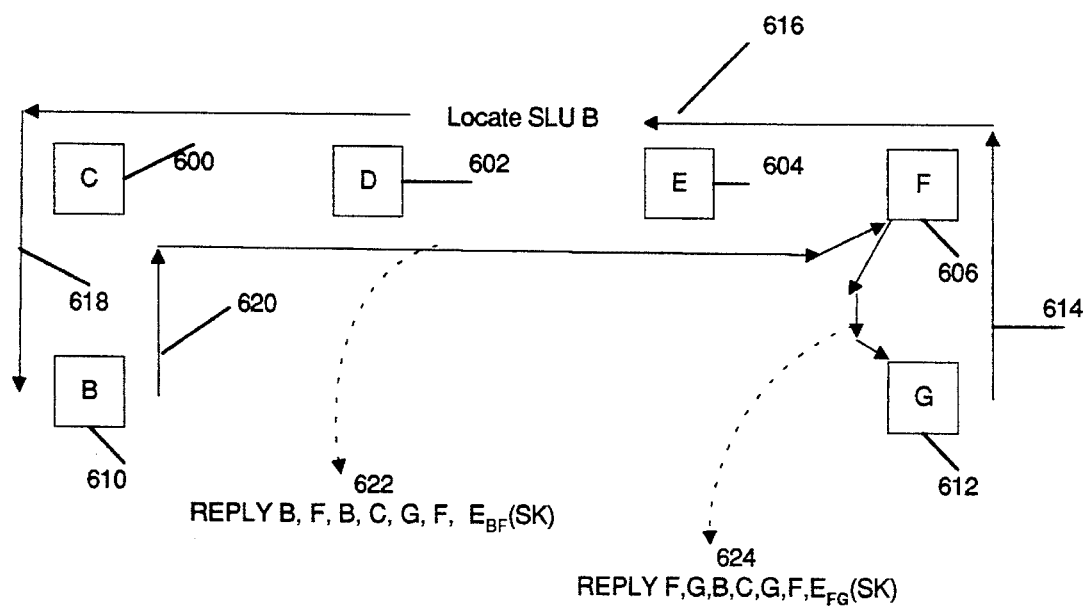
FIG. 6 illustrates a transaction in an APPN network in which a secondary node, or a network resource at a node, is located in response to a LOCATE query by a primary node, and the REPLY to the LOCATE includes an encrypted session key for encrypting further messages between the primary and secondary nodes, or resources. In accordance with the invention, the secondary node may have a selection of cross domain keys with which to encrypt the session key, as explained herein.

When an APPN node wishes to establish a session with another node, the node initiates a LOCATE request which is transmitted throughout the network and ultimately results in a REPLY message returned to the LOCATING node. In SNA (System Network Architecture) terminology, the LOCATING node is considered to be the primary node and is represented by a primary logical unit (PLU) identification. The desired node or a node containing the desired resource is deemed secondary and is represented by a secondary logical unit identification (SLU). The method by which a node or resource is located in an APPN network is described in U.S. Pat. No. 4,914,571, which issued on Apr. 3, 1990 to Baratz et. al. Reference is made to this patent. However, sufficient details are included herein to teach the use of the invention in general network and APPN network environments. FIG. 6 illustrates a specific example of a LOCATE and session establishment in the network of FIG. 5. In this example, end node G (612) wishes to establish a session with end node B (610). It is assumed for this example, that B shares keys with its serving network node C and the serving network node F for the locating node G. To begin the establishment, end node G initiates a LOCATE request to its serving network node F (606) to locate node B (or a resource that happens to reside in node B) and to establish the session. This is shown as 614 in FIG. 6. In response, Network node F initiates a LOCATE SLU B request communication which it transmits into the network. The aforementioned U.S. Pat. No. 4,914,571 explains the full details of the LOCATE. For our purposes, it is sufficient to say that the LOCATE request is propagated to network node E (604), hence to network node D (602), hence to network node C (600) and hence to the desired end node B (610). This is shown as 616 and 618 in FIG. 6. The LOCATE message identifies the requesting node (G in this example). Once the destination node is located, it returns a REPLY to the requesting node along the same path that the LOCATE message traversed to locate the desired node or resource. In FIG. 6, the REPLY is shown as transmissions 620 from node B to node C, 622 from node C to node F and 624 from node F to node G.

In APPN networks, session encryption is accomplished by first establishing a session key with which all subsequent messages are encrypted on that session. In other words, the session key changes with each session. To accomplish this, a session key is generated by the SLU node, encrypted with a cross domain key (CDK) (a node is usually considered to be a domain in an APPN network) and the encrypted session key is transmitted to the PLU in the REPLY communication. The CDK is a shared key between different nodes. Thus, the encrypted message discussed in earlier figures is an encrypted session key, and the REPLY communication of an APPN network is used to distribute the session key in encrypted format; all subsequent encrypted communications on this session between the two nodes is encrypted using the distributed session key.

Figure 7:
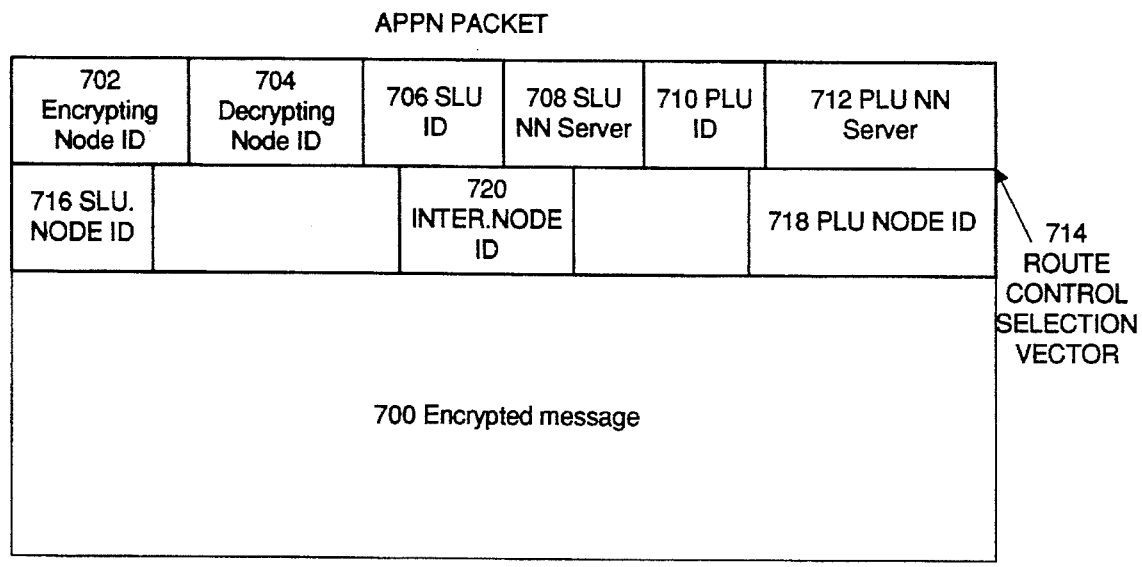
FIG. 7 shows an illustrative REPLY packet for the APPN system of FIG. 6.

An illustrative format of a REPLY communication is shown in FIG. 7. Here, the encrypted message in field 700 corresponds to the encrypted session key discussed above. A communication header is attached to the encrypted session key; the header includes in field 702 the identification of the node that encrypted the session key, the identification in field 704 of the node that should decrypt the session key and, in field 706, the identification of the SLU (node B in this example). In addition, if the SLU is an end node, field 708 contains an identification of the network node serving the SLU. Field 710 contains an identification of the PLU (node G in this example) and, if the PLU is an end node, field 712 contains an identification of the network node (F in this example) serving the PLU (G). In addition, the header contains a Route Selection Control Vector (RSCV) 714, which contains in ordered sequence identifications of all nodes in the route between the SLU and the PLU. For example, the first field 716 of RSCV 714 contains the identity of the SLU node B and the last field 718 contains the identity of the PLU node G. Other fields (not shown) contain the identities of the serving network nodes, if any, serving the PLU and SLU if they are end nodes. Still other fields like 720 identify all other intermediate nodes in the route. In the example of FIGS. 5 and 6, intermediate nodes are nodes D and E. The header, as summarized here, is generated as a result of normal APPN services and are described in more detail in many APPN publications available from IBM.

Returning to FIG. 6, at 622, and as shown in FIG. 7, the illustrative format of the REPLY communication is REPLY Encrypting node, decrypting node, SLU, SLU NN Server, PLU, PLU NN Server, $Ex_{XY}(SK)$, where SLU=Secondary Logical Unit PLU=Primary Logical Unit NN=Network Node SK=Session Key $Ex_{XY}(SK)$=the encrypted session key, using a key shared between nodes X and Y.

Since it has been assumed that node B shares keys with its serving network node C and with node G's network node server F, then according to the preferred key selection algorithm, node B selects the shared key with node F, which is the closest node to the destination node G. Accordingly, the REPLY communication 622 contains the information

REPLY B, F, B, C, G, F, $E_{BF}[SK]$ where the first B is the encrypting node, the first F is the node that should decrypt the message, the second B is the SLU identification, C is the network node server for SLU B, G is the PLU, the second F is the network node server for the PLU G and $E_{BF}[SK]$ represents the session key SK encrypted with the key shared between nodes B and F. Node B then transmits the communication to its network node server C. C examines the header and determines that it is not identified as a node that should decrypt the communication. Accordingly, node C transmits the communication on. When node F receives the REPLY communication, it recognizes that it is the decrypting node, decrypts the session key, determines that G is the destination, reencrypts the session key with a key shared with G and then transmits a new REPLY communication with the newly encrypted session key to G. This new REPLY communication is shown as 624 in FIG. 6 and contains the following information according to the format discussed above

REPLY F, G, B, C, G, F, $E_{FG}[SK]$.

Figure 8:
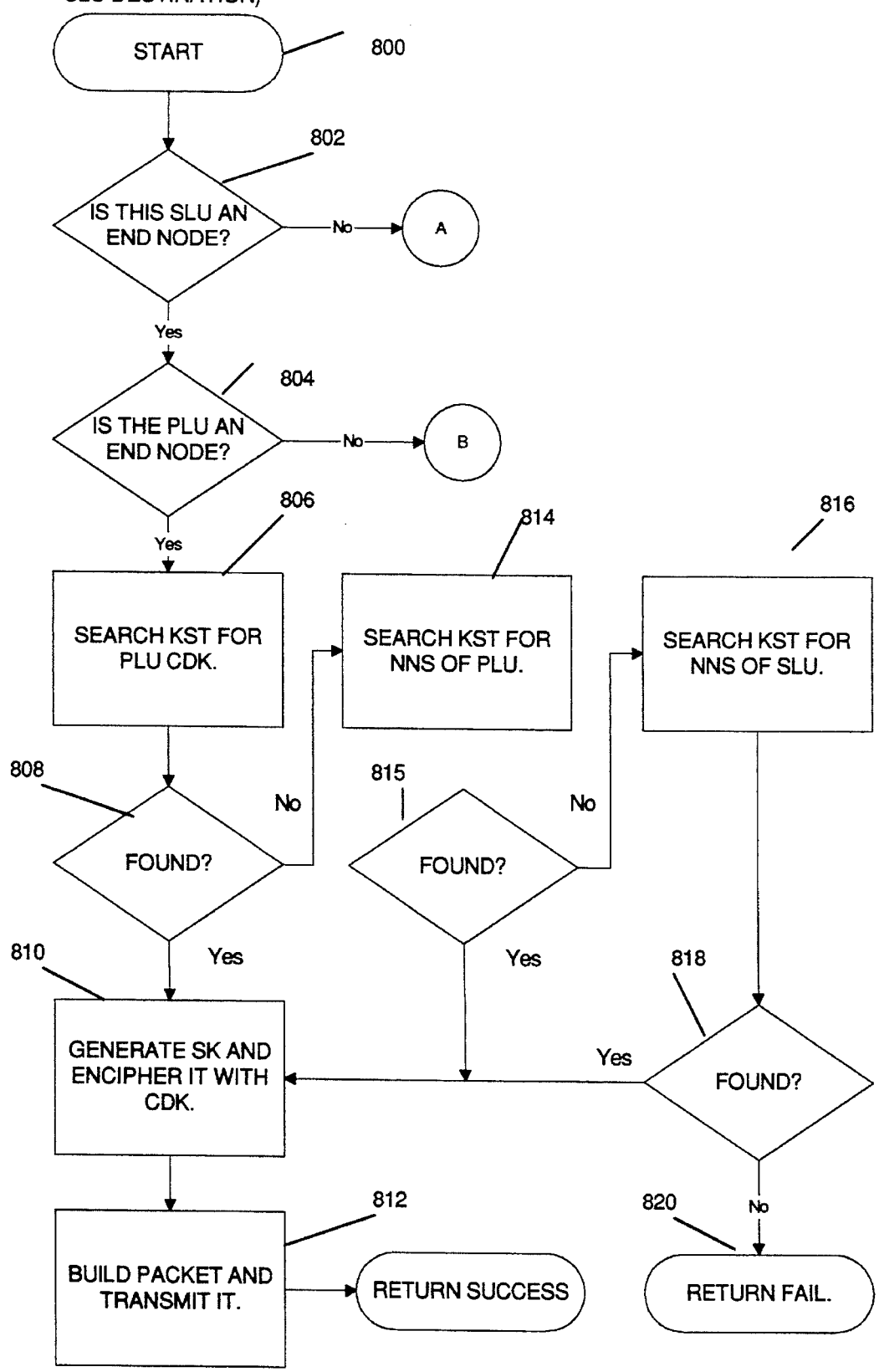

The operation of establishing the session key in the example of FIG. 6 is now described in detail using the flowcharts of FIGS. 8 through 1.

FIG. 8 shows an illustrative algorithm that is executed in each node (SLU) generating a REPLY communication in response to a LOCATE communication. Recall that the encrypted session key is transmitted by the SLU to the PLU as the encrypted message in the REPLY communication. In this example of FIG. 6, end node G is the PLU and the LOCATE destination node B is the SLU. The algorithm is executed in the SLU and starts at step 800. Step 802 determines if the SLU (node B) is an end node, which is true in this example. Therefore, step 804 is executed where it is determined if the PLU (node G) is an end node, which is also true in this example (the preceding LOCATE message identified the type of requesting node). In this event, step 806 begins the portion of the algorithm in which both the SLU and PLU are end nodes. Because of APPN network constraints not applicable to general use of the invention, specifically that intermediate nodes do not examine headers other than the RSCV, the only possibilities are that the SLU shares a CDK with the PLU, or with the network node serving the PLU, or with the network node serving the SLU. In step 806, the SLU searches its KST table to determine if it contains a cross domain key (CDK) for the PLU (node G). If it does, then steps 808 and 810 generate a random session key (SK) and encrypt it with the shared CDK. The communication containing the encrypted SK is built in an otherwise known way and transmitted toward the PLU in step 812. This successfully ends the algorithm at the SLU for this transmission.

Step 814 is executed in the SLU if the SLU does not share a CDK with the PLU end node. Step 814 searches the KST for a shared key with the network node F serving the PLU end node (G). If this CDK is found at step 815, then step 810 builds the communication using that shared key and transmits it as above discussed. Finally, if a shared key is not found for the server of node G, step 816 searches the KST for a key shared with the server node for this SLU. This is node C in FIG. 6. This is the final possibility in an APPN architecture and, if properly designed by an owner, this key will be present assuming that encrypted communication is to be allowed between the PLU and the SLU. In this case step 818 results in the use of this key to encrypt and transmit the SK to the PLU. Otherwise, the session is failed at step 820.

Figure 9:
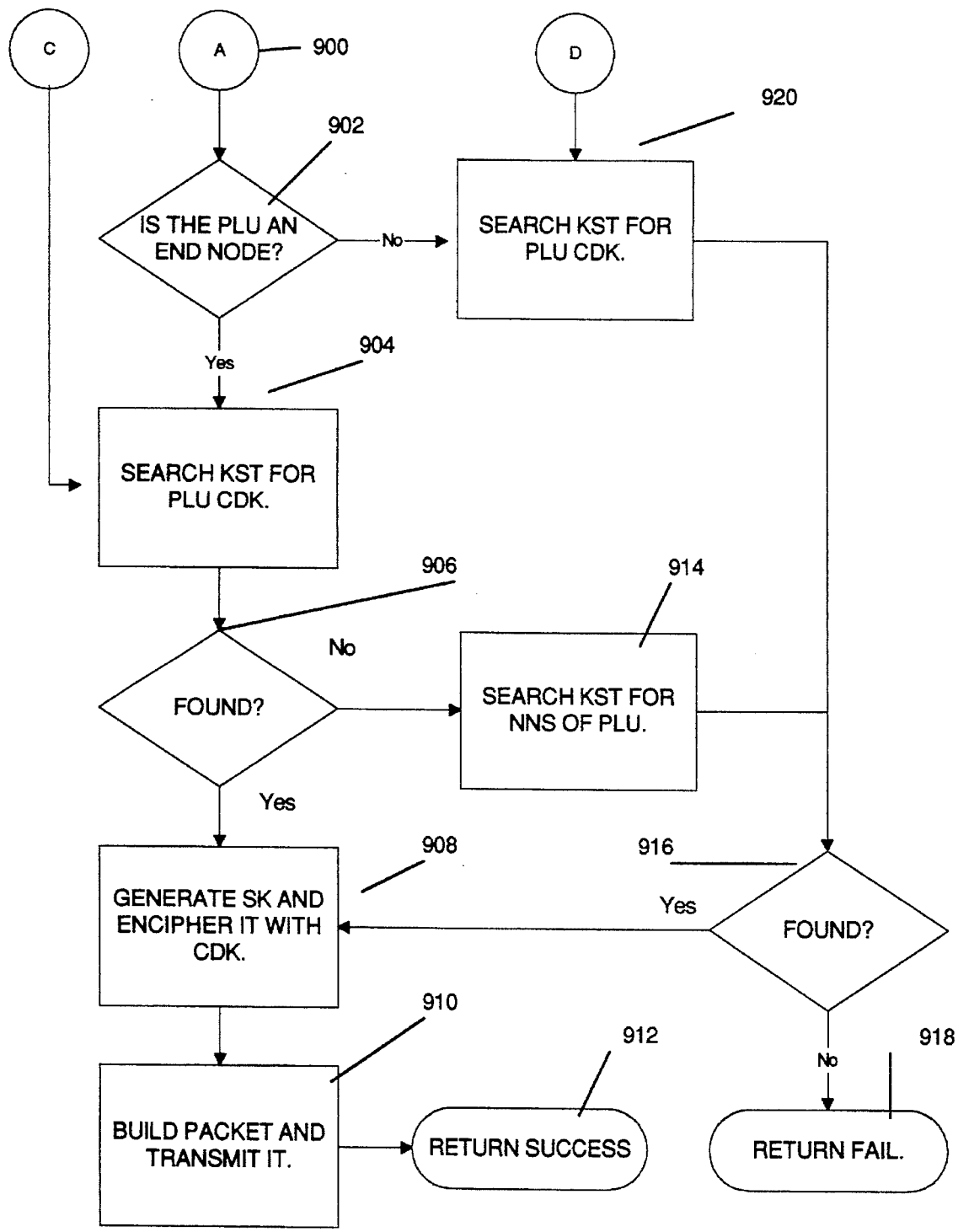

At step 802, if the SLU is determined not to be an end node, then it must be a serving network node and the algorithm starting at label A (900) of FIG. 9 is entered. Step 902 determines if the PLU is an end node. If the answer is yes, this represents the case where the PLU is an end node and the SLU is a network node. For example, this would be the case in FIG. 6 if node G were the node requesting a session with network node C. In this case, the only possibilities in an APPN network are shared keys between the SLU network node C and end node G or with network node F which serves PLU end node G. Step 904 searches the SLU KST for a shared CDK with the PLU. If such a key is found at step 906, it is used to encrypt a SK and transmit it toward the PLU at steps 908, 910 and 912. If the search at step 906 fails, step 914 searches the KST for a shared CDK with the network node server of the PLU. This CDK is used if found at step 916. Otherwise, the session is failed at step 918.

If the test at step 902 determines that the PLU is not an end node then step 920 is executed. This represents the case where both the SLU and the PLU are network nodes. In this case, the only possibility in an APPN network is that the SLU shares a key with the PLU. Step 920 searches the KST for this key. If found, it is used at step 916. Otherwise, the session is failed at step 918.

Figure 10:
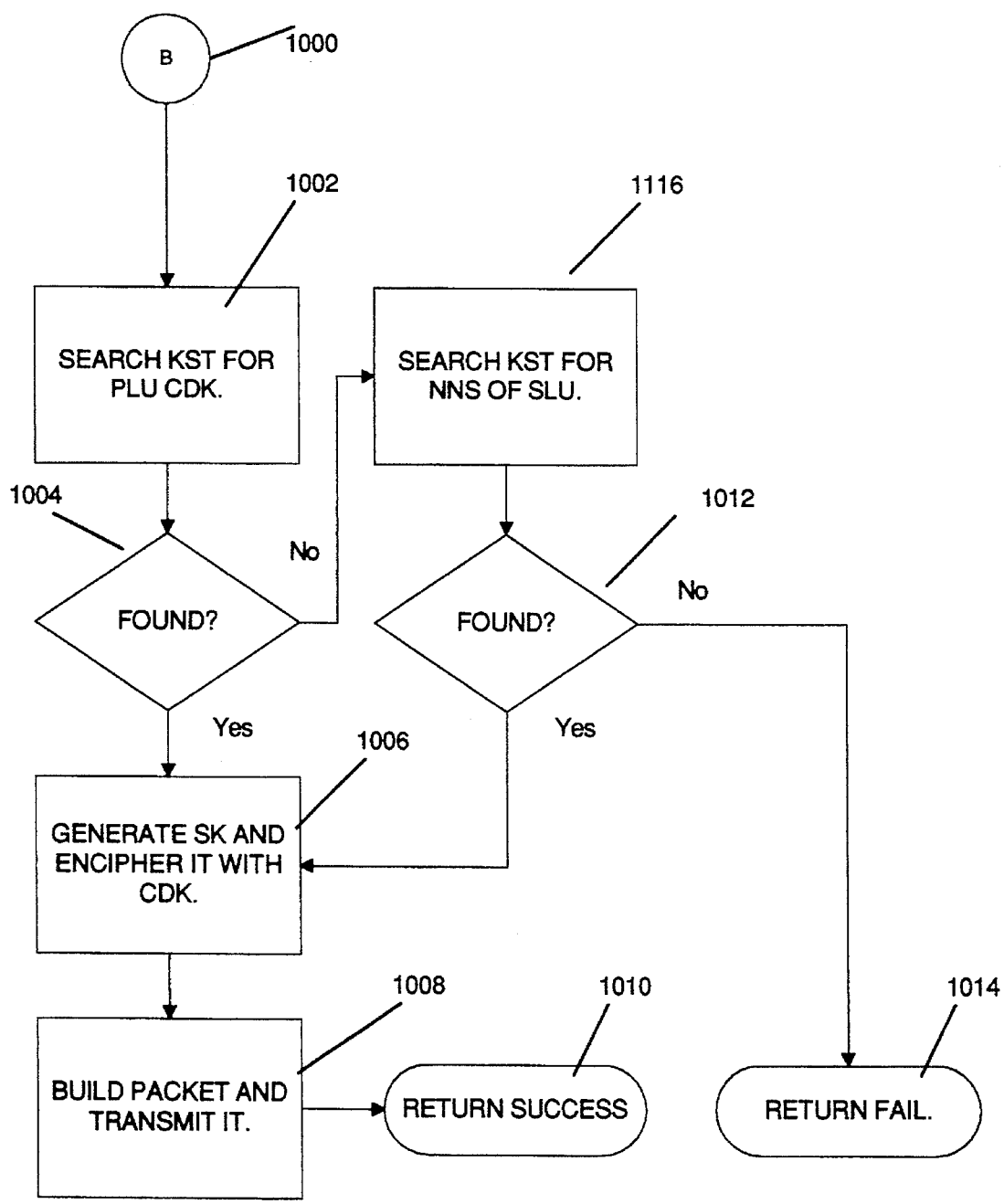

If step 804 determines that the PLU is not an end node, the label B (1000) in FIG. 10 is entered. This point represents the case in which the SLU is an end node and the PLU is a network node. In this case, the only possibilities are that the SLU shares a CDK with the PLU network node or the network node serving the SLU end node. Step 1002 searches the KST for a CDK shared with the PLU network node. As already discussed, if the CDK is found, it is used to encrypt a session key at steps 1004, 1006, 1008 and 1010. If this key is not found, then the KST is searched for a shared CDK with the network node server of the SLU. If it is found it is used at 1012. Otherwise, the session is failed at step 1014.

FIG. 11 shows an illustrative algorithm that is executed by each node upon the receipt of a REPLY communication. The start point is at step 1100. Recall that in APPN networks intermediate nodes only pass the communication on toward the destination, without performing any other substantive processing. Step 1102 examines the Route Selection Control Vector (RSCV) in the communication header to determine if this receiving node is an intermediate node, in which case step 1104 transmits the communication onward as above indicated. Otherwise, step 1106 examines field 704 of the header to determine if this receiving node is identified as a decrypting node. If this node is not so identified, step 1104 again transmits the communication onward according to its routing list in the RSCV. If the receiving node is identified as a decrypting node, step 1108 determines from the header the node that encrypted the message portion, selects the CDK shared with the encrypting node from its KST and decrypts the session key contained in the message. The receiving node now determines what to do with the decrypted session key. If the RSCV identifies this node as the final destination (the PLU), then the session key is passed to another application at the node (step 1112) for processing in a normal manner. If this node is not the destination node, then according to the constraints of an APPN network, it must either be the network node serving the originator (the SLU) or the network node serving the destination (the PLU). Step 1114 makes this determination. If this node is the SLU server, entrance C in FIG. 9 is entered, as in the originating node, where the KST is searched to locate a CDK for either the PLU or the server of the PLU. If a CDK is shared with the PLU, this key is selected and used to reencrypt the session key and the new communication is transmitted onward toward the PLU. If a CDK is not shared with the PLU, then the key shared with the PLU server is selected and the same steps performed with that CDK. If at step 1114, it is determined that this node is the server for the PLU end node, then entrance D in FIG. 9 is entered to select the CDK shared with the PLU.

It is to be understood that the above described arrangements are merely illustrative of the application of principles of the invention and that other arrangements may be devised by workers skilled in the art without departing from the spirit and scope of the invention.

I claim:

1. In a data communications network having a plurality of nodes interconnected for communicating messages through the network, the method of performing secure message communication, comprising the steps of determining a route from an originating node to a destination node, selecting as a decrypting node any other node along the route with which the originating node shares an encryption key, encrypting a message intended for the destination node with the selected key and adding in clear form both the identities of the originating and decrypting nodes to the message, transmitting the message along the route, decrypting the message at the decrypting node in response to receipt of the message, if the decrypting node is not the destination node, repeating the selecting, encrypting and transmitting steps by the decrypting node with respect to any other node in the remaining route to the destination node with which the decrypting node shares an encryption key, and transmitting the newly encrypted message along the remaining route.

2. In a data communications network having a plurality of nodes interconnected for communicating messages through the network, the method of performing secure message communication, comprising the steps of at a message originating node, determining the identity of a destination node to receive a message, selecting an encryption key from one or more alternative keys, said selected key being shared with another node along a route toward the destination node, encrypting the message with the selected key, forming a communication by, including with the encrypted message a clear identification of the originating node and an clear identification of the decrypting node with which the selected key is shared, and transmitting the communication toward the node with which the selected key is shared.

3. The method of claim 2 further comprising the following steps performed at a node, in response to the receipt of a communication, determining if this receiving node is identified in the communication as a decrypting node, and if this receiving node is identified as a decrypting node, decrypting the message portion of the communication using the key shared with the encrypting node used to encrypt the message.

4. The method of claim 3 further comprising determining from the communication if this receiving node is the destination node, if the receiving node is not the destination node, selecting a new encryption key shared with any other node along the remaining route toward the destination node, re-encrypting the decrypted message using the new selected key, forming a new communication by including with the re-encrypted message a clear identification of this receiving node and a clear identification of the new decrypting node with which the newly selected key is shared, and transmitting the new communication toward the new decrypting node.

5. In a data communications network having a plurality of nodes interconnected in a selected manner for communicating messages through the network, the method of performing secure message communication, comprising the steps of at a message originating node, determining the identity of a destination node to receive a message, determining if the originating node shares a first encryption key with the destination node, and, if so, encrypting the message with the first key, otherwise, selecting a second encryption key shared with any other node along the message route to the destination node and encrypting the message with the second key, forming a communication by including with the encrypted message a clear identification of the decrypting node with which the selected key is shared by the originating node and a clear identification of the originating node, transmitting the communication along a route which includes the node with which the selected key is shared.

6. The method of claim 5 further comprising the following steps performed at a node in response to the receipt of a communication from another node, determining if the receiving node is identified in the communication as a decrypting node, if the receiving node is identified as a decrypting node, decrypting the message portion of the communication using a key shared with the encrypting node, determining from the communication if the receiving node is the destination node;

if the receiving node is not the destination node, determining from the communication the identity of the destination node, determining if the receiving node shares a third encryption key with the destination node, and, if so, encrypting the message with the third key, otherwise, selecting a fourth encryption key shared with any other node along the remaining route to the destination node and re-encrypting the message with the fourth key, forming a new communication by including with the re-encrypted message a clear identification of the node with which the selected key is shared and a clear identification of the receiving node, and transmitting the new communication along the remaining route which includes the node with which the selected key is shared.

7. A method for secure communication performed at a node of a communication network, comprising the steps of generating an encrypted version of a message to be transmitted to a destination node by selecting an encryption key from one or more alternative keys, said selected key being shared with another node along a route toward the destination node, encrypting the message with the selected key, forming a communication by including with the encrypted message a clear identification of the encrypting node and an clear identification of the decrypting node with which the selected key is shared, and transmitting the communication toward the node with which the selected key is shared.

8. The method of claim 7 further comprising the steps of responsive to a receipt of a communication from another node, determining if this node is identified in the communication as a decrypting node, if so, determining from the communication the encrypting node, selecting the key shared with the encrypting node, and decrypting the message.

9. The method of claim 8 further comprising the steps of determining from the communication if this node is the destination node, if this node is not the destination node, selecting another encryption key from one or more alternative keys, said selected another key being shared with another node along the remaining route toward the destination node, re-encrypting the message with the said another selected key, forming a new communication by including with the re-encrypted message a clear identification of this node as the encrypting node and a clear identification of the new decrypting node with which the new selected key is shared, and transmitting the new communication toward the node with which the new selected key is shared.

10. Apparatus in a data communications network having a plurality of nodes interconnected for communicating messages through the network, comprising means for determining a route from an originating node to a destination node, means for encrypting a message intended for the destination node with one or more alternative keys known to other nodes in the route, means at each node in the route for determining if a received message is encrypted with a key known to the receiving node, means responsive to the last determining means for decrypting the message, means for re-encrypting the decrypted message with a different key shared with any other selected node in the remaining route, and means for transmitting the re-encrypted message on the remaining route.

11. Apparatus at each node of a data communications network having a plurality of nodes interconnected for communicating messages through the network, comprising means for determining a route from an originating node to a destination node, means for selecting as a message decrypting node any other node along the route with which the originating node shares an encryption key, means for encrypting a message with the selected key, means for adding the identities of the originating and decrypting nodes in clear form to the encrypted message, means for transmitting the message along the route, means for decrypting a received message, means for determining if the node is not the destination node for the received message, and means responsive to the last determining means for re-encrypting the decrypted received message with a key shared with any other selected node in the remaining route, and means for transmitting the re-encrypted message on the remaining route.

* * * * *